(12) United States Patent
Kwatra et al.

(10) Patent No.: US 11,223,800 B1
(45) Date of Patent: Jan. 11, 2022

(54) SELECTIVE REACTION OBFUSCATION

(71) Applicant: INTERNATIONAL BUSINESS MACHINES CORPORATION, Armonk, NY (US)

(72) Inventors: Shikhar Kwatra, San Jose, CA (US); Vijay Ekambaram, Chennai (IN); Christopher J. Hardee, Raleigh, NC (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 17/087,698

(22) Filed: Nov. 3, 2020

(51) Int. Cl.
| | |
|---|---|
| H04N 7/15 | (2006.01) |
| G06K 9/00 | (2006.01) |
| H04N 5/272 | (2006.01) |
| G06K 9/62 | (2006.01) |
| H04N 5/232 | (2006.01) |
| G10L 25/63 | (2013.01) |

(52) U.S. Cl.
CPC ......... *H04N 7/157* (2013.01); *G06K 9/00302* (2013.01); *G06K 9/6262* (2013.01); *G10L 25/63* (2013.01); *H04N 5/23219* (2013.01); *H04N 5/272* (2013.01)

(58) Field of Classification Search
CPC combination set(s) only.
See application file for complete search history.

(56) References Cited

U.S. PATENT DOCUMENTS

| | | |
|---|---|---|
| 5,880,731 A | 3/1999 | Liles |
| 8,243,116 B2 | 8/2012 | Qvarfordt |
| 9,118,737 B2 | 8/2015 | Mattingly |
| 9,277,180 B2 | 3/2016 | Cunico |
| 9,402,057 B2 | 7/2016 | Kaytaz |
| 10,432,687 B1 | 10/2019 | Hanes |
| 2008/0215972 A1 | 9/2008 | Zalewski |

(Continued)

FOREIGN PATENT DOCUMENTS

WO 2014194439 A1 12/2014

OTHER PUBLICATIONS

Fabri, "Emotionally Expressive Avatars for Collaborative Virtual Environments", Leeds Metropolitan University, Nov. 2006, pp. 1-190.

(Continued)

*Primary Examiner* — Phung-Hoang J Nguyen
(74) *Attorney, Agent, or Firm* — John Noh

(57) ABSTRACT

A method, a computer program product, and a computer system selectively obfuscate a reaction during a communication session. The method includes determining a predicted sentiment for a user who is a participant in a communication session based on a topic being discussed in the communication session. The method includes determining a predicted expression for a reaction to be exhibited by the user based on sensory inputs received from the user while the topic is being discussed. The method includes determining an intent of the reaction based on the predicted sentiment and the predicted expression. The method includes determining a reward score of the reaction based on a type of the reaction and a context of the communication session while the predicted expression is to be exhibited. The method includes rendering a mask over the user based on at least one of the intent and the reward score.

14 Claims, 5 Drawing Sheets

(56) References Cited

U.S. PATENT DOCUMENTS

| | | | |
|---|---|---|---|
| 2009/0164916 A1 | 6/2009 | Jeong | |
| 2014/0019443 A1* | 1/2014 | Golshan | G06F 16/24578 |
| | | | 707/723 |
| 2018/0331842 A1 | 11/2018 | Faulkner | |
| 2019/0222892 A1 | 7/2019 | Faulkner | |
| 2020/0036783 A1* | 1/2020 | Bourassa | H04W 4/08 |
| 2020/0202579 A1* | 6/2020 | Caballero | G06T 11/00 |

OTHER PUBLICATIONS https://www.meetinvr.com/, "MeetingVR—Business Meetings & Collaboration in VR", printed Nov. 3, 2020, pp. 1-7.

Mell et al., "The NIST Definition of Cloud Computing", National Institute of Standards and Technology, Special Publication 800-145, Sep. 2011, pp. 1-7.

* cited by examiner

SELECTIVE REACTION OBFUSCATION

BACKGROUND

The exemplary embodiments relate generally to communication sessions, and more particularly to selectively obfuscating a reaction by a participant of the communication session according to intent and context.

There are many instances in which a virtual meeting may be held in which a plurality of participants joins a meeting in an online capacity. The virtual meeting may allow participants who are located separately to still attend a meeting as if physically in a common location. The virtual meeting may also provide a convenience for participants to attend a meeting without requiring the physical requirement of actually going to a designated location. During the virtual meeting, the participants may discuss a variety of topics that may be selected in an agenda. While discussing these topics, the participants may react positively, negatively, and anything in between. The virtual meeting may be configured such that, for those participants who select to activate a self-facing camera, each of these participants may be viewed by other participants of the virtual meeting through a user interface of the virtual meeting. However, there are instances in which a participant may want to maintain obfuscation or anonymity by not displaying the participant's face in real time but instead want to convey only certain reactions in a selective manner. The participant may further want to allow the conversation to proceed without hampering such as deactivating the camera while still having the ability to show the select reactions in a dynamic manner.

SUMMARY

The exemplary embodiments disclose a method, a computer program product, and a computer system for selectively obfuscating a reaction during a communication session. The method comprises determining a predicted sentiment for a user who is one of a plurality of participants in a communication session based on a topic being discussed in the communication session. The method comprises determining a predicted expression for a reaction to be exhibited by the user based on sensory inputs received from the user while the topic is being discussed. The method comprises determining an intent of the reaction based on the predicted sentiment and the predicted expression. The method comprises determining a reward score of the reaction based on a type of the reaction and a context of the communication session while the predicted expression is to be exhibited. The method comprises rendering a mask over the user based on at least one of the intent and the reward score.

BRIEF DESCRIPTION OF THE SEVERAL VIEWS OF THE DRAWINGS

The following detailed description, given by way of example and not intended to limit the exemplary embodiments solely thereto, will best be appreciated in conjunction with the accompanying drawings, in which.

The drawings are not necessarily to scale. The drawings are merely schematic representations, not intended to portray specific parameters of the exemplary embodiments. The drawings are intended to depict only typical exemplary embodiments. In the drawings, like numbering represents like elements.

DETAILED DESCRIPTION OF THE SEVERAL VIEWS OF THE DRAWINGS

Figure 1:
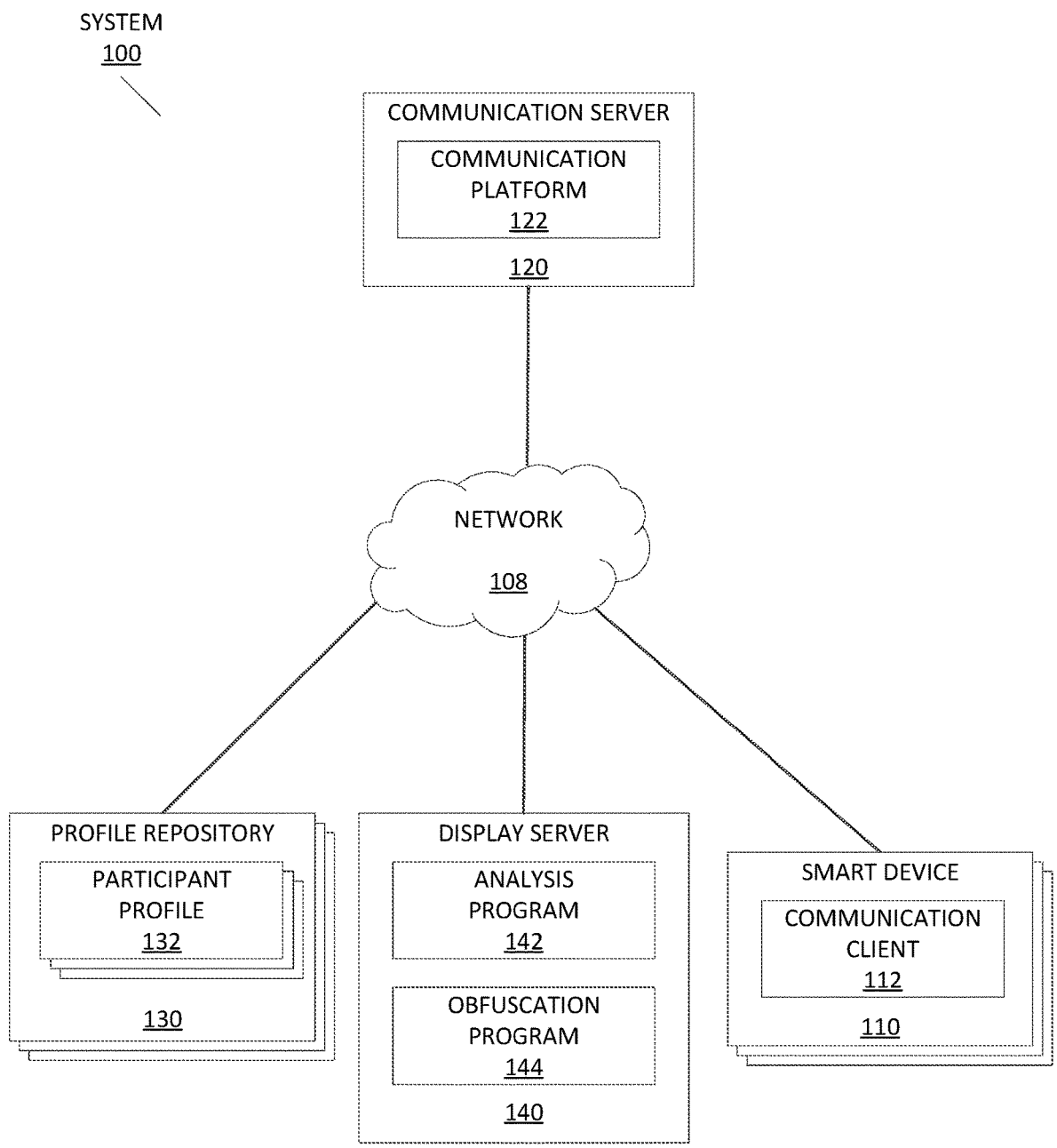
FIG. 1 depicts an exemplary schematic diagram of an emotion obfuscating system 100, in accordance with the exemplary embodiments.

Detailed embodiments of the claimed structures and methods are disclosed herein; however, it can be understood that the disclosed embodiments are merely illustrative of the claimed structures and methods that may be embodied in various forms. The exemplary embodiments are only illustrative and may, however, be embodied in many different forms and should not be construed as limited to the exemplary embodiments set forth herein. Rather, these exemplary embodiments are provided so that this disclosure will be thorough and complete, and will fully convey the scope to be covered by the exemplary embodiments to those skilled in the art. In the description, details of well-known features and techniques may be omitted to avoid unnecessarily obscuring the presented embodiments.

References in the specification to "one embodiment", "an embodiment", "an exemplary embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to implement such feature, structure, or characteristic in connection with other embodiments whether or not explicitly described.

In the interest of not obscuring the presentation of the exemplary embodiments, in the following detailed description, some processing steps or operations that are known in the art may have been combined together for presentation and for illustration purposes and in some instances may have not been described in detail. In other instances, some processing steps or operations that are known in the art may not be described at all. It should be understood that the following description is focused on the distinctive features or elements according to the various exemplary embodiments.

The exemplary embodiments are directed to a method, computer program product, and system for selectively obfuscating a reaction during a communication session. As will be described in greater detail herein, the exemplary embodiments are configured to monitor the communication session and identify participants of a virtual meeting who allow for reactions of the identified participants to be viewed by other participants. While monitoring the communication session, the exemplary embodiments may determine when one of the identified participants shows a predetermined reaction that is to be obfuscated based on a user's profile associated with the identified participant. As a result of determining the predetermined reaction, the exemplary embodiments may obfuscate the view of the identified participant to prevent the predetermined reaction from being seen by the other participants where the other participants may also be selected based on the user's profile. The exemplary embodiments may further assess whether the predetermined reaction was intentionally or unintentionally made by the identified participant which may be a consideration that is incorporated in obfuscating the identified participant. Key benefits of the exemplary embodiments may include providing a dynamic and seamless approach to selectively obfuscating and/or filtering out certain reactions or emotions based on a user's profile defining settings for this feature and monitoring an ongoing conversation. Detailed implementation of the exemplary embodiments follows.

Conventional approaches to monitoring communication sessions that incorporate features related to reactions may include a variety of different mechanisms. For example, a conventional approach may generate and/or display a transcript associated with a conference session. This conventional approach may determine an activity hotspot during the conference session so that a user may efficiently and effectively locate a time in the conference session where engagement among the participants was strongest. In another example, a conventional approach may utilize avatars with automatic gesturing and bounded interaction for online chat sessions. This conventional approach may utilize associated bitmap files that include frames illustrating the avatar in different poses, actions, and emotional states so that selected frames are displayed in rapid sequence in accord with a script file to create an animation effecting each gesture. In a further example, a conventional approach may utilize biometric masking by testing video data and/or audio data from a video conference for biometric markers indicative of a certain emotion or stress level. If the biometric marker is detected with the testing, the video data and/or the audio data is edited to mask the biometric marker so that the video data and the audio data is transmitted to participants of the video conference with the biometric marker masked. However, the conventional approaches do not describe a mechanism that learns whether a reaction is intentional or unintentional for a selected user nor do the conventional approaches describe selectively rendering an intentional reaction for selected participants of a communication session.

In contrast to conventional approaches, the exemplary embodiments may be configured to selectively obfuscate and/or filter out predetermined reactions that are expressed in a virtual environment based on settings defined for a user who is a participant in the virtual environment. The exemplary embodiments may selectively obfuscate and/or filter reactions based on whether the reaction is intentional or unintentional with respective mechanisms being used according to the intent. The exemplary embodiments may further be configured to inculcate viewer specific output filtering that is more explicitly chosen by the user such as selecting which other participants of the virtual environment who are permitted to view selected reactions according to various factors (e.g., hierarchy, timeliness, conversation context, etc.).

The exemplary embodiments are described with regard to a virtual environment being a virtual meeting and related to reactions of the users. However, the use of virtual meetings and reactions is only exemplary. The exemplary embodiments may be utilized and/or modified to be used in various other environments and to obfuscate and/or filter other aspects that may be sensed. For example, the virtual environment may be any online communication between two or more participants such as a chat session to a formal speech. In another example, the aspect to be obfuscated and/or filtered may relate to other sensory outputs such as auditory outputs, haptic outputs, etc.

The exemplary embodiments are also described with regard to participants being human users in a communication session. However, the use of human users is only exemplary. As new techniques are developed in which a participant may be a non-human user such as an artificial intelligence entity, the exemplary embodiments may be utilized and/or modified to apply the obfuscation features for such participants.

It is noted that the description below utilizes the terms "user" and "participant" where the participant may be any user that is part of a communication session. Thus, when the user is not part of the communication session, the user may not be considered a participant. When describing the communication session and users who are participants thereof, the terms "user" and "participant" may be used interchangeably.

FIG. 1 depicts an emotion obfuscating system 100, in accordance with the exemplary embodiments. According to the exemplary embodiments, the emotion obfuscating system 100 may include one or more smart devices 110, a communication server 120, one or more profile repositories 130, and a display server 140, which may all be interconnected via a network 108. While programming and data of the exemplary embodiments may be stored and accessed remotely across several servers via the network 108, programming and data of the exemplary embodiments may alternatively or additionally be stored locally on as few as one physical computing device or amongst other computing devices than those depicted.

In the exemplary embodiments, the network 108 may be a communication channel capable of transferring data between connected devices. Accordingly, the components of the emotion obfuscating system 100 may represent network components or network devices interconnected via the network 108. In the exemplary embodiments, the network 108 may be the Internet, representing a worldwide collection of networks and gateways to support communications between devices connected to the Internet. Moreover, the network 108 may utilize various types of connections such as wired, wireless, fiber optic, etc. which may be implemented as an intranet network, a local area network (LAN), a wide area network (WAN), or a combination thereof. In further embodiments, the network 108 may be a Bluetooth network, a WiFi network, or a combination thereof. In yet further embodiments, the network 108 may be a telecommunications network used to facilitate telephone calls between two or more parties comprising a landline network, a wireless network, a closed network, a satellite network, or a combination thereof. In general, the network 108 may represent any combination of connections and protocols that will support communications between connected devices. For example, the network 108 may also represent direct or indirect wired or wireless connections between the components of the emotion obfuscating system 100 that do not utilize the network 108.

In the exemplary embodiments, the smart device 110 may include a communication client 112 and may be an enterprise server, a laptop computer, a notebook, a tablet computer, a netbook computer, a personal computer (PC), a desktop computer, a server, a personal digital assistant (PDA), a rotary phone, a touchtone phone, a smart phone, a mobile phone, a virtual device, a thin client, an Internet of Things (IoT) device, a console, or any other electronic device or computing system capable of receiving and sending data to and from other computing devices. While the smart device 110 is shown as a single device, in other embodiments, the smart device 110 may be comprised of a cluster or plurality of computing devices, in a modular manner, etc., working together or working independently. The smart device 110 is described in greater detail as a hardware implementation with reference to FIG. 3, as part of a cloud implementation with reference to FIG. 4, and/or as utilizing functional abstraction layers for processing with reference to FIG. 5.

In the exemplary embodiments, the communication client 112 may act as a client in a client-server relationship and may be a software, hardware, and/or firmware based application capable of allowing a user of the smart device 110 to participate in a communication session with another user via the network 108. In embodiments, the communication client 112 may operate as a user interface allowing the user to select a communication session that is to be joined and enter inputs that are converted into outputs to other participants of the communication session (e.g., a video input, an audio input, a text input, etc.), and utilize various wired and/or wireless connection protocols for data transmission and exchange associated with performing a communication session, including Bluetooth, 2.4 gHz and 5 gHz internet, near-field communication, Z-Wave, Zigbee, etc.

The user may utilize the communication client 112 to log into the communication server 120 that may be hosting the communication session. As a result of joining the communication session such as a virtual meeting, the user may be a participant who may, relative to the user, receive outputs from other participants and/or transmit inputs to the other participants. The user may have an account or guest status linked to the communication server 120 that identifies the user to the other participants. For example, the account may include a user name and/or a password. Once logged into the communication server 120, the user may be identified according to the account information. In another example, the user may only be joining the communication session hosted by the communication server a single time or infrequently such that a guest login option is available. The user may provide information that may be used in identifying the user to the other participants.

The smart device 110 may be equipped with a variety of input devices (not shown) such as a string input device (e.g., a keyboard), a mouse, a voice input device (e.g., a microphone), an imager (e.g., a camera), etc. through which the user may enter inputs for the communication session. The smart device 110 may also be equipped with a variety of output devices (not shown) such as a display device, a voice output device (e.g., speakers), etc. In executing the communication client 112, the smart device 110 may utilize the input devices and the output devices for communications to be exchanged among the two or more participants of the communication session. For example, the input devices may receive inputs from the user of the smart device 110 and transmit corresponding data to be converted into outputs for the other participants. In another example, the output devices may receive outputs from the other participants and generate receivable information to the user of the smart device 110. In a particular example, the imager may capture images of the user of the smart device 110 that may be converted into a video display to the other participants while the display device may receive video displays of the other participants that may be viewed by the user of the smart device 110.

In the exemplary embodiments, the communication server 120 may include a communication platform 122 and act as a server in a client-server relationship with the communication client 112 and may be a software, hardware, and/or firmware based application capable of hosting a communication session for participants via the network 108. The communication server 120 may be an enterprise server, a laptop computer, a notebook, a tablet computer, a netbook computer, a PC, a desktop computer, a server, a PDA, a rotary phone, a touchtone phone, a smart phone, a mobile phone, a virtual device, a thin client, an IoT device, or any other electronic device or computing system capable of receiving and sending data to and from other computing devices. While the communication server 120 is shown as a single device, in other embodiments, the communication server 120 may be comprised of a cluster or plurality of computing devices, working together or working independently. While the communication server 120 is also shown as a separate component, in other embodiments, the operations and features of the communication server 120 may be incorporated with one or more of the other components of the emotion obfuscating system 100. For example, the communication session may be hosted remotely on the communication server 120 or locally on the smart device 110 via the communication client 112. The communication server 120 is described in greater detail as a hardware implementation with reference to FIG. 3, as part of a cloud implementation with reference to FIG. 4, and/or as utilizing functional abstraction layers for processing with reference to FIG. 5.

In the exemplary embodiments, the communication platform 122 may host the communication session that includes two or more participants. The communication platform 122 may be configured to host a plurality of different types of communication sessions. For example and as used for illustrative purposes herein, the communication session may be a virtual video meeting. The virtual video meeting may show the various participants in the user interface of the communication client 112 to the user where the viewable participants include those who have selected to transmit a video output. Each participant may be shown in near real time such that the communication platform 122 may render the video output of the participants for the communication client 112 so that the user may see the participant and reactions of the participant as they occur. The communication platform 122 may render the video output of the participants as an actual video or a virtual video. For example, the video output may be actual imagery captured of the participants and rendered as such for viewing by the user. According to this exemplary embodiment, each participant may be shown in a respective window of the user interface. In another example, the video output may be a virtual image that is rendered that reflects the current reaction of the participant. In this exemplary embodiment, the user interface of the communication client 112 may generate a virtual environment in which the participants may be positioned (e.g., a table setting where participants are represented as virtual people sitting around the table). In other exemplary embodiments, the communication platform 122 may host a communication session that is only audio based, optionally haptic based, etc.

In the exemplary embodiments, the profile repository 130 may include one or more participant profiles 132 and may be an enterprise server, a laptop computer, a notebook, a tablet computer, a netbook computer, a PC, a desktop computer, a server, a PDA, a rotary phone, a touchtone phone, a smart phone, a mobile phone, a virtual device, a thin client, an IoT device, or any other electronic device or computing system capable of storing, receiving, and sending data to and from other computing devices. While the profile repository 130 is shown as a single device, in other embodiments, the profile repository 130 may be comprised of a cluster or plurality of electronic devices, in a modular manner, etc., working together or working independently. While the profile repository 130 is also shown as a separate component, in other embodiments, the profile repository 130 may be incorporated with one or more of the other components of the emotion obfuscating system 100. For example, the profile repository 130 may be incorporated in the display server 140. Thus, access to the profile repository 130 by the display server 140 may be performed locally. In another example, the participant profiles 132 represented in the profile repository 130 may be incorporated in respective ones of the smart device 110 (e.g., each smart device 110 has a profile repository 130 including at least the participant profile 132 of the user who is respectively associated). Thus, access to the profile repository 130 and to a specific one of the participant profiles 132 may be performed through a transmission from the smart device 110. The profile repository 130 is described in greater detail as a hardware implementation with reference to FIG. 3, as part of a cloud implementation with reference to FIG. 4, and/or as utilizing functional abstraction layers for processing with reference to FIG. 5.

In the exemplary embodiments, the participant profiles 132 may each be associated with a respective user who is a participant in the communication session. The participant profiles 132 may be populated with various types of information that may be used by the display server 140 to determine when and how to obfuscate and/or filter reactions of the corresponding user. For example, the participant profiles 132 may include historical information from previous communication sessions for the users with associated context information from the corresponding previous communication sessions. Further historical information (e.g., further previous communication sessions relative to a previous communication session) may also be incorporated so that a continuity of reaction and context may be identified. In this manner, a sentiment profile of the user may be incorporated into the participant profiles 132 that show linkages between topics and reactions for a selected user. The participant profiles 132 may also incorporate other information that may be used to predict, estimate, or otherwise gauge how a user may react based on a current context of a communication session. For example, in a work environment where the communication session is a virtual meeting of one or more managers with one or more further employees, the participant profiles 132 may track, for the user, an employment position, a current workload, a reporting hierarchy, personal indicators (e.g., past relationships during projects with another participant), current projects the user is a part, projects the user is scheduled to be a part, etc.

The participant profiles 132 may also include setting information. The setting information may be manually provided by the user associated with a select one of the participant profiles 132. The setting information may alternatively or additionally be automatically determined (e.g., by the display server 140) and stored in the participant profiles 132. The setting information may indicate a set of reactions that may be viewed generally (e.g., by all participants of a communication session), a set of reactions that are to be obfuscated (e.g., to all participants of a communication session), and a set of reactions that is to be selectively obfuscated (e.g., only select participants may view the reaction). Accordingly, the user associated with one of the participant profiles 132 may enter setting information that indicates how and when the user is willing to share reactions with the other participants of the communication session. The setting information may also include various rules and/or manual selections of participants who may or may not receive selected reactions made by the user. For example, the user may select an option for a rule where all negatively construed reactions are to be obfuscated while all positively construed reactions may be shown. The construing of reactions will be described in further detail below with regard to a reward mechanism. In another example, the user may enter different individuals such that when such an individual who is also a participant in the communication session with the user may be identified for obfuscation purposes. The setting information may also indicate how a reaction is to be shown or obfuscated based on an intent of the reaction (e.g., the user intentionally or unintentionally reacted to a context of the communication session). The setting information may further indicate a mask that may be rendered for reactions that are unintentional as well as indicate a further mask that may be selectively rendered for reactions that are intentional.

The participant profiles 132 may additionally include a timeliness information that associates historical relationships of a user with the other participants of the communication session. The timeliness information may indicate how to dynamically adjust the setting information. For example, the participant profile 132 may indicate a reporting chain for the user for individuals who have been or who are currently part of the reporting hierarchy for the user. The setting information may include a default setting that restricts certain expressions to individuals one or more levels higher in the hierarchy of the user. However, the user may have had a historical relationship with a participant who is now higher in the hierarchy (e.g., further participant is a vice president while the user is a manager but historically have worked together closely and more directly in the past). The timeliness information may be updated such that such a historical relationship may adjust the setting information accordingly. For example, if the relationship has been maintained and the user and the further participant have a healthy relationship, the setting information may be relaxed over time based on how much time has been spent on previous communication sessions. In another example, if the relationship has been determined to have soured over time, the setting information may be maintained despite the historical relationship being present.

The participant profiles 132 may be updated (e.g., by the display server 140) so that the various information used to obfuscate and/or filter reactions for a user is current. For example, the participant profiles 132 may be updated dynamically such that each piece of information of the user is updated when a corresponding event has occurred (e.g., a communication session has concluded for new information to be extracted, a new work item has been scheduled for the user, etc.). In another example, the participant profiles 132 may be updated at predetermined time intervals (e.g., every set number of hours, days, weeks, etc.) or at predetermined event intervals (e.g., after the conclusion of each communication session).

In the exemplary embodiments, the display server 140 may include an analysis program 142 and an obfuscation program 144 and act as a server in a client-server relationship with the communication platform 122 as well as be in a communicative relationship with the profile repository 130. The display server 140 may be an enterprise server, a laptop computer, a notebook, a tablet computer, a netbook computer, a PC, a desktop computer, a server, a PDA, a rotary phone, a touchtone phone, a smart phone, a mobile phone, a virtual device, a thin client, an IoT device, or any other electronic device or computing system capable of receiving and sending data to and from other computing devices. While the display server 140 is shown as a single device, in other embodiments, the display server 140 may be comprised of a cluster or plurality of computing devices, working together or working independently. While the display server 140 is also shown as a separate component, in other embodiments, the operations and features of the display server 140 may be incorporated with one or more of the other components of the emotion obfuscating system 100. For example, the operations and features of the display server 140 may be incorporated in the smart device 110, particularly the smart device 110 of the user that is hosting the communication session. In another example, the operations and features of the display server 140 may be incorporated in the communication server 140, particularly when the communication server 140 is hosting the communication session. The display server 140 is described in greater detail as a hardware implementation with reference to FIG. 3, as part of a cloud implementation with reference to FIG. 4, and/or as utilizing functional abstraction layers for processing with reference to FIG. 5.

In the exemplary embodiments, the analysis program 142 may be a software, hardware, and/or firmware application configured to perform a plurality of operations and generate an output used in determining when and how to obfuscate and/or filter a reaction by a user. As will be described in further detail below, the analysis program 142 may monitor a progress of a communication session, identify a predicted context of the communication session at a moment during the communication session, determine a predicted sentiment by a user who is a participant in the communication session, determine a predicted expression to be made by the user, determine whether the predicted expression is intentional, and generate the output based on the various identifications and determinations.

In an exemplary operation, the analysis program 142 may monitor a progress of a communication session. In monitoring the communication session, the analysis program 142 may receive data from the communication platform 122 for a communication session that is in progress or is about to start until a subsequent time such as until the communication session has concluded (e.g., the host has ended the communication session, all participants have left the communication session, etc.). As the communication session progresses, the analysis program 142 may receive the data that may include inputs that are entered by each participant, screen shares, files that are exchanged with one or more participants, etc. The data may be converted and/or formatted into a form that is processed by the analysis program 142. For example, the inputs that are entered as text, as an audio input, as a video input, etc. may be converted into an appropriate format for processing and subsequent consideration.

In receiving the data of the communication session that is in progress, the analysis program 142 may process the data in a corresponding manner. For example, the analysis program 142 may receive text inputs from the participants. The analysis program 142 may parse the text input and utilize any processing mechanism (e.g., natural language processing (NPL)) to determine a context of the text input. In another example, the analysis program 142 may receive audio inputs from the participants. The analysis program 142 may convert the audio into text, where appropriate, and proceed as if the audio input was received as a text input. The analysis program 142 may utilize any other audio processing mechanism that may be used to interpret a sound that is uttered by a participant (e.g., an audible sigh may be processed to indicate frustration or other emotion based on context, a laugh may be processed to indicate happiness or other emotion based on context, etc.). In a further example, the analysis program 142 may receive video inputs from the participants. The analysis program 142 may utilize various mechanisms that may process the individual images or series of consecutive images of the video input (e.g., changes between sequential images) to determine a variety of aspects. For example, the analysis program 142 may analyze the video input using micro-expression techniques to determine physical changes exhibited by the participant. In another example, the analysis program 142 may analyze the video input to determine audio being spoken through a visual analysis (e.g., lip reading techniques) to confirm, replace, add, etc. any audio data that may be received. The outputs from the analysis program 142 may be utilized for subsequent operations performed by the analysis program 142 or other program (e.g., the obfuscation program 144).

In another exemplary operation, the analysis program 142 may identify a predicted context of the communication session at a moment during the communication session. As described above, the analysis program 142 may monitor a progress of the communication session utilizing the data including the inputs of the participants and incorporating other information that may be available. For example, the analysis program 142 may analyze the inputs from the participants to determine a topic of discussion (e.g., the leader of the communication session may have uttered a statement indicating a portion of a project that is to be discussed). In another example, the analysis program 142 may have access to a scheduling application or communication exchanges between the participants that may have occurred at a different time (e.g., prior to the communication session) that includes an agenda for the current communication session and a breakdown of time durations to discuss topics in the agenda. The analysis program 142 utilize any available information to determine a context that is being or will be discussed at a given moment.

In a further exemplary operation, the analysis program 142 may determine a predicted sentiment by a user who is a participant in the communication session based on the context of the communication session. As noted above, the display server 140 and the analysis program 142 may have access to the participant profiles 132 stored in the profile repository 130. The participant profiles 132 may have data related to prior communication sessions and correlations between sentiments expressed by the user for various topics discussed during the prior communication sessions. In this manner, the participant profiles 132 may include a sentiment profile for the user that shows linkages between topics and sentiments that were previously expressed by the user during prior communication sessions. The analysis program 142 may utilize the sentiment profile and the information from the prior communication sessions to determine various trends for sentiments being expressed for corresponding topics. The trends may be, for example, consistency, types of changes (e.g., negative change over time, positive change over time, etc.), random, etc. Based on the trends, the analysis program 142 determine a topic being discussed and determine a predicted sentiment likely to be expressed by the user while the participants are discussing the topic.

In yet another exemplary operation, the analysis program 142 may determine a predicted expression to be made by the user based on expression recognition performed on the user. As described above, the smart device 110 may be transmitting one or more inputs provided by the user during the communication session including a video input, an audio input, etc. The analysis program 142 may also have access to the data for the inputs from the user. The analysis program 142 may be configured to process the data for the inputs to determine a predicted expression to be made by the user at a subsequent time (e.g., within a predetermined time frame from a current moment). The predicted expression may be a determination that is made independent of the context of the communication session but rather based on the data for the inputs from the user. For example, based on the video input from the user, the analysis program 142 may utilize microexpression techniques to determine physical changes to the user's face and/or gesticulation techniques to determine physical movements by the user. The analysis program 142 may utilize the physical facial changes and/or physical movements to identify a likely predicted expression that the user may exhibit. In another example, based on the audio input from the user, the analysis program 142 may utilize various voice analytical techniques to determine a mood that the user will likely exhibit (e.g., increased or decreased speaking volume may be indicative of a likely change in mood, a increased or decreased speaking rate may be indicative of a likely change in mood, etc.). Based on the data of the inputs for the user, the analysis program 142 determine a predicted expression likely to be expressed by the user during the communication session.

In an additional exemplary operation, the analysis program 142 may determine whether the predicted expression is intentional. Utilizing the outputs of the analysis program 142 in determining the predicted sentiment and the predicted expression, the analysis program 142 may further determine whether the predicted expression is intentional or unintentional. By comparing the predicted sentiment and the predicted expression, the analysis program 142 may determine whether the predicted expression is aligned with the predicted sentiment. For example, for a predicted sentiment, there may be a plurality of different expressions that may correspond to exhibiting the predicted sentiment. As a result of the predicted expression being one of the expressions that correspond to the predicted sentiment, the analysis program 142 may determine that the predicted expression is intentional. For any other predicted expression, the analysis program 142 may determine that the predicted expression is unintentional. There may be instances where the participant profile 132 does not have any information regarding a particular topic (e.g., new user) or has insufficient information to formulate a confident prediction (e.g., based on a confidence value relative to a confidence threshold). In such an instance, the analysis program 142 may determine that the predicted expression is unintentional until a predicted sentiment may be determined.

In yet a further exemplary operation, the analysis program 142 may generate the output based on the various identifications and determinations that is provided to the obfuscation program 144. The exemplary embodiments may be configured to dynamically obfuscate and/or filter reactions from the user based on various predictions and whether a predicted expression that represents the reaction being intentional or unintentional. Therefore, based on the previously determined outputs by the analysis program 142 regarding a predicted context, a predicted sentiment, a predicted expression, and an associated intent, the analysis program 142 may determine the manner in which the display server 140 is to obfuscate or filter a reaction or omit such a feature. The analysis program 142 may generate the output that directs how the obfuscation program 144 is to proceed in obfuscating the user reactions.

The analysis program 142 may one or more of the determinations with differing priorities to generate the output. For example, the analysis program 142 may utilize the intent of the user as an initial consideration in generating the output. Thus, when a reaction is determined to be intentional, the analysis program 142 may proceed along a first set of subsequent operations while, when a reaction is determined to be unintentional, the analysis program 142 may proceed along a second set of subsequent operations.

As will be described in greater detail below, in an exemplary implementation, the analysis program 142 may utilize a reward based mechanism where a negative reward being determined indicates that a reaction is to be obfuscated. It is noted that the negative reward may be associated with any type of reaction. The context in which a reaction is made may affect a determination of the type of reward rather than a particular reaction being assumed to be positive or negative. For example, the user may react by laughing which is generally associated with a positive demeanour. However, the context may drastically affect the type of reward (e.g., when the context is a manager negatively critiquing the co-worker's work quality). In such an instance, a laughing reaction may be improper and have a negative reward associated therewith. In another example, the user may react by frowning which is generally associated with a negative demeanour. However, the context may again drastically affect the type of reward (e.g., when the context is hearing upsetting news and showing sympathy). In such an instance, a frowning reaction may be proper and have a positive reward associated therewith. Thus, the analysis program 142 may determine the type of reward based on the predicted reaction, the context in which the predicted reaction is made, and any other available information that may affect the outcome of a reward determination.

According to an exemplary embodiment, the analysis program 142 may selectively render a mask to obfuscate the user reaction when the reaction is determined to be intentional. The analysis program 142 may be configured to determine the type of reward associated with an intentional reaction. For example, a predicted, intentional reaction having a positive reward may be shown to each of the other participants of the communication session. In another example, a predicted, intentional reaction having a negative reward may be shown to selected ones of the other participants of the communication session where the selected participants may be manually selected by the user (e.g., as indicated in the participant profile 132 associated with the user, as determined by timeliness information, etc.). As will be described below, the other participants who are not selected may be shown a mask that is rendered for display over the user's face. For predicted, intentional reactions having a negative reward, the analysis program 142 may utilize a blank mask for the selected participants so that the reaction may still be seen although the blank mask was rendered. Therefore, the analysis program 142 may generate the output that indicates the manner in which the intentional reaction is to be transmitted to the other participants of the communication session.

According to an exemplary embodiment, the analysis program 142 may generate the output to indicate that the user reaction is to be obfuscated when the reaction is determined to be unintentional. For example, the obfuscation may be performed using a mask that is rendered for display over the user's face. The analysis program 142 may be configured to determine that an unintentional reaction has a negative reward associated therewith regardless of the context of the communication session in which the unintentional reaction is predicted to be made. Thus, for any reaction that is unintentional that is predicted to be made by the user, the analysis program 142 may generate the output to indicate the use of the mask to obfuscate the predicted, unintentional reaction. For unintentional reactions, the analysis program 142 may also generate the output so that the unintentional reaction of the user is obfuscated to each of the other participants of the communication session.

The association of a negative reward with an unintentional reaction is only for illustrative purposes in the exemplary embodiment. The exemplary embodiments may be configured to further analyze the predicted, unintentional reaction and the context such that a reward score may be determined and reactions associated with a positive reward may be shown while reactions associated with a negative reward may be obfuscated. Accordingly, the exemplary embodiments may obfuscate the user's reaction in a substantially similar process as selectively obfuscating the user's reaction for intentional reactions.

The analysis program 142 may utilize a reward mechanism in which a reward score is determined for intentional reactions. As described above, the analysis program 142 may utilize a variety of inputs that may contribute to determine the reward score (e.g., the predicted reaction, the context in which the predicted reaction is likely to be expressed, a user history for the predicted reaction, etc.). The reward score may be leveraged against a reward threshold. For example, the reward score may range from −1 to 1 where the reward threshold is set to 0. Thus, a reward score ranging from −1 to 0 may be determined to be a negative reward whereas a reward score ranging from 0 to 1 may be determined to be a positive reward. The analysis program 142 may also utilize a reinforcement learning model that processes prior communication sessions, topics discussed during the prior communication sessions, reactions corresponding to the topics, etc. in a manner that is described in further detail below. Accordingly, with a positive reward being determined, the analysis program 142 may generate the output so that no obfuscation is performed while with a negative reward being determined, the analysis program 142 may generate the output so that an obfuscation is performed for identified participants.

The analysis program 142 may be configured to also update and maintain the participant profiles 132 stored in the profile repository 130. As a user participates in communication sessions, the analysis program 142 may determine various correlations between reactions and topics identified via the context in the respective communication sessions. In determine the various correlations and/or linkages between topics and reactions, the analysis program 142 may update the participant profile 132 associated with the user with regard to this aspect utilized in future communication sessions for obfuscation purposes.

For example, a user may initiate a virtual conversation such as via a web conference chat, a communication platform (e.g., virtual reality, augmented reality, mixed reality, etc.), etc. In monitoring the communication session, the analysis program 142 may utilize an operation (e.g., real-time cascade classifier) to detect and monitor the user's facial profile with corresponding topics which may be associated with the participant profile 132. The analysis program 142 may further monitor the user's facial expressions and reactions (F) at a particular time frame (T) that may be stored as a key value pair format (F, T).

In monitoring the communication sessions that the user is a participant, the analysis program 142 may track conversation responses with respect to past conversations (e.g., topics) and corresponding user facial expressions. In this manner, the analysis program 142 may track a plurality of topics and the corresponding reaction that was expressed to generate the sentiment profile stored in the participant profile 132. The analysis program 142 may include further information such that the sentiment profile may provide information beyond a topic to reaction linkage. For example, the analysis program 142 may determine a trend or changes to reactions for a given topic over time. In an exemplary scenario, in a first communication session that occurred at a first time, the user may have started learning a first technical discipline such that discussion of the first technical discipline in the first communication session may have caused the user to exhibit apprehension or nervousness. However, in one or more second communication sessions that occurred at a respective second time that occurs after the first time, the user may have become increasing proficient at the first technical discipline such that discussion of the first technical discipline in the second communication session may cause no reaction or cause the user to exhibit comfort. In this manner, the analysis program 142 may track changes to reactions over time for a topic. When the participant profile 132 is further configured to store this information, the analysis program 142 may be configured to apply such learning to new scenarios that may be substantially similar (e.g., when the user is learning a second technical discipline, the analysis program 142 may determine that a predicted expression may be apprehension in a manner similar to a prior instance with the first technical discipline).

Through the above mechanism, the analysis program 142 may generate the sentiment profile that provides a basis in which to predict sentiments that are expressed by the user when a topic is discussed during a communication session. For example, the analysis program 142 may generate the sentiment profile as a model including regions or feature maps through processing frames of the communication session that may be buffered into chunks (e.g., expression F={f1, f2, f3, . . . , fn} at time T={t1, t2, t3, . . . , tn} in correlation with topics that were discussed).

In the exemplary embodiments, the obfuscation program 144 may be a software, hardware, and/or firmware application configured to receive the output from the analysis program 142 and perform subsequent operations that may obfuscate the user based on the output. As described above, the output may include various types of information that the obfuscation program 144 may utilize to determine how and when to obfuscate the user's reaction. For example, the output may include an indication that a predicted reaction from the user is intentional and the user is to be obfuscated as a result of a negative reward being determined for the predicted, intentional reaction. In another example, the output may include an indication that a predicted reaction from the user is intentional but no obfuscation is to be performed as a result of a positive reward being determined for the predicted, intentional reaction. In a further example, the output may include an indication that a predicted reaction from the user is unintentional and the user is to be obfuscated as a result of this intent.

Based on the output, for instances when the obfuscation program 144 is to obfuscate the user's reaction, the obfuscation program 144 may utilize a mask. According to an exemplary implementation, the obfuscation program 144 may add a mask branch to an area of the user's broadcast by creating a masking shield around a model of the user. The obfuscation program 144 may then utilize a segmentation mask for each region that includes the user's image (e.g., at inflection points at respective frame buffers and time intervals). As noted above, the obfuscation program 144 may utilize a mask for instances when the reaction is to be shown to one or more of the other participants. For example, when the reaction is to be seen (e.g., selectively when the predicted reaction is intentional and has a negative reward, when the predicted reaction is intentional and has a positive reward, etc.), the obfuscation program 144 may utilize a blank mask that is rendered on the user but shows the underlying image of the user and the user's reaction. Alternatively, the obfuscation program 144 may omit the user of a mask.

The obfuscation program 144 may utilize various types of masks. In an exemplary implementation, the user may indicate a mask that is to be used for obfuscation purposes For example, when the user is shown with actual imagery, the user may have selected a default image (e.g., as stored in the participant profile 132 of the user), captured an image prior to the start of the communication session (e.g., an option may be presented for the user to perform this action or the user may manually upload such an image that is to be used when the obfuscation is to be performed), etc. from which the obfuscation program 144 may generate the mask. In another example, when the user is represented with an avatar (e.g., in a virtual or mixed environment), the obfuscation program 144 may select a non-descript image (e.g., having an emotionless pose and expression) from which to generate the mask. For a duration that the predicted reaction is determined, the obfuscation program 144 may show the mask when the user's reaction is to be obfuscated.

For the virtual or mixed environments in which the communication session is performed, the obfuscation program 144 may utilize a different approach. For example, the communication platform 122 may determine reactions and motions that the user is performing in real time so that the avatar representing the user may also show corresponding reactions and motions. For the reactions, the communication platform 122 may generate emojis or other emotion conveying imagery for corresponding reactions. When a particular reaction is to be obfuscated, the obfuscation program 142 may provide instruction to the communication platform 122 for when the emoji is to be omitted such that a default image (e.g., the non-descript image) is shown on the avatar instead. The obfuscation program 142 may also provide instruction to the communication platform 122 for the selective rendering of the emoji to be shown for certain participants (e.g., when the predicted reaction is intentional with a negative reward).

As described above, using the participant profile 132 of the first player, the obfuscation program 144 may determine the participants for which the obfuscation feature is to be used. The participant profile 132 may include various information that may directly and/or indirectly indicate other participants in the communication session for which the obfuscation feature may be used based on the output. For example, the user may manually provide indications for other users that the user is willing to share intentional reactions having a negative reward. In another example, the obfuscation program 144 may utilize a hierarchy characteristic (e.g., in a work setting) where the user shares intentional reactions having a negative reward with other users who are above the user while the user obfuscates intentional reactions having a negative reward with other users who are peers or below the user or vice versa. In a further example, the obfuscation program 144 may utilize the timeliness information such that individuals who have a historical context may be identified and the historical context indicating whether to obfuscate or share reactions from the user.

Figure 2:
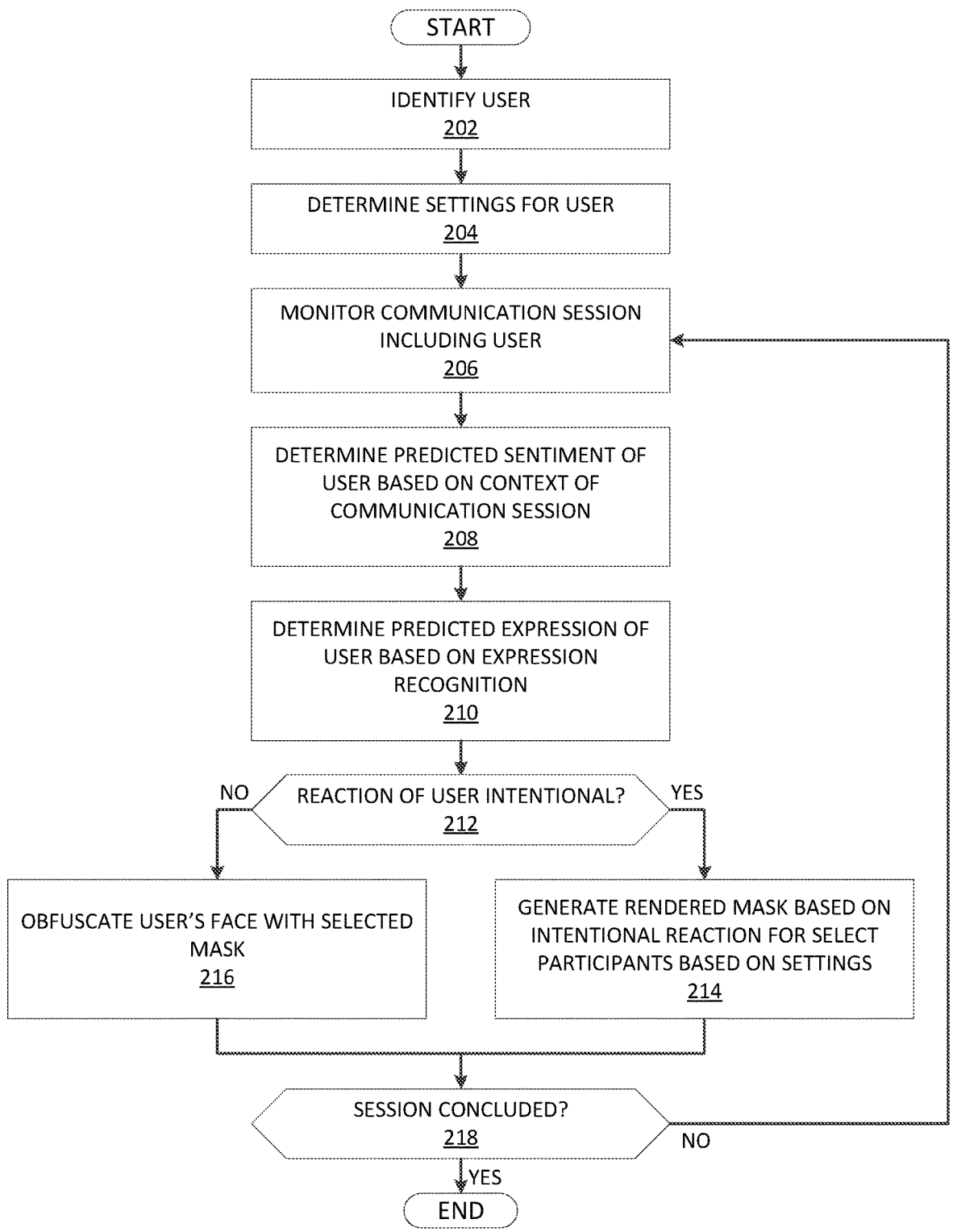
FIG. 2 depicts an exemplary flowchart of a method illustrating the operations of an analysis program 142 and an obfuscation program 144 of the display server 140 of the emotion obfuscating system 100 in selectively obfuscating a reaction during a communication session, in accordance with the exemplary embodiments.

FIG. 2 illustrates an exemplary flowchart of a method illustrating the operations of an analysis program 142 and an obfuscation program 144 of the display server 140 of the emotion obfuscating system 100 in selectively obfuscating a reaction during a communication session, in accordance with the exemplary embodiments. The method 200 will be described from the perspective of the display server 140.

The display server 140 may identify the user who is a participant in a communication session (step 202). The display server 140 may determine the two or more participants of the communication session based on a variety of information that may be available. For example, prior to joining the communication session, each participant may provide login information that may be used to identify the user. In another example, the display server 140 may determine a desk location, an address, etc. that may be used to correlate with other information (e.g., as stored in the participant profiles 132) to identify the users. Based on the identity of the user, the display server 140 may determine various settings that are associated with the user who is a participant in the communication session (step 204). For example, the settings may be stored in the participant profile 132 of the user as determined by the participant profile 132, as provided by the user, etc. The settings may include an option that indicates whether the user may be viewed by the other participants, an option that indicates a willingness to share reactions with other participants, other participants for which reactions may be shared, etc.

The display server 140 may monitor a communication session that includes the identified user as a participant (step 206). In monitoring the communication session, the display server 140 may receive inputs from the participants such as text inputs, video inputs, audio inputs, etc. The display server 140 may process the inputs to determine a plurality of different aspects such as a topic of discussion, a reaction, etc. The display server 140 may also have access to other information such as scheduling information, emails, etc. to determine various aspects of the communication session such as a time and date for the communication session, an agenda for topics of discussion during the communication session, etc.

In monitoring the communication session, the display server 140 may determine a predicted sentiment of the user based on a context of the communication session (step 208). Thus, at a given moment, the display server 140 may determine a topic being discussed in the communication session (e.g., based on the inputs, based on a schedule of planned discussions, etc.). The display server 140 may utilize the participant profile 132 that may include a sentiment profile that indicates linkages between topics and reactions as exhibited during historical communication sessions where the user was a participant. According to the topic being discussed, the display server 140 may determine the predicted sentiment based on the information of the participant profile 132. For topics that are not included in the participant profile 132, the display server 140 may indicate that there is no associated sentiment.

The display server 140 may also determine a predicted expression of the user based on expression recognition techniques (step 210). The display server 140 may utilize the inputs from the user including the text input, the video input, the audio input, etc. to determine visual changes (e.g., micro-expressions, physical changes, etc.), audio inflections (e.g., increase in volume, types of sounds, etc.), text parsing (e.g., interpretation of text that is input), etc. The display server 140 may interpret the various inputs and determine the predicted expression that the user is likely to exhibit.

The display server 140 may determine whether the reaction by the user is intentional (decision 212). The reaction may correspond to the predicted expression to be exhibited by the user. In considering the predicted expression and the predicted sentiment, the display server 140 may determine whether the reaction is intentional or unintentional. As a result of the reaction being intentional (decision 212, "YES" branch), the display server 140 may generated a rendered mask for selected other participants based on the settings included in the participant profile 132 of the user (step 214). As described above, the display server 140 may utilize a first set of operations for reactions that are intentional. For example, the display server 140 may determine a reward score and determine whether the reaction has a negative reward or a positive reward. For positive rewards, the display server 140 may omit any obfuscation of the user. For negative rewards, the display server 140 may show the reaction to select other participants and obfuscate the reaction to the remaining other participants as indicated in the participant profile 132 of the user. As a result of the reaction being unintentional (decision 212, "NO" branch), the display server 140 may obfuscate the user's reaction (step 216). As described above, the display server 140 may utilize a second set of operations for reactions that are unintentional. For example, the display server 140 may assume that the reward score for an unintentional reaction is a negative reward. Accordingly, the display server 140 may obfuscate the reaction of the user. For unintentional reactions, the display server 140 may also obfuscate the user to all other participants although other exemplary embodiments may utilize a substantially similar approach to intentional reactions having a negative reward.

The display server 140 may determine whether the communication session has concluded (decision 218). As a result of the communication session continuing (decision 218, "NO" branch), the display server 140 may continue to perform the operations in monitoring the communication session and providing the obfuscating feature where appropriate. As a result of the communication session concluding (decision 218, "YES" branch), the display server 140 may cease monitoring activities. As the communication session is now historical with regard to a current time, the display server 140 may update and/or modify the settings for the user in the participant profile (not shown).

The exemplary embodiments are configured to dynamically determine when and how to obfuscate a reaction from a user who is sharing sensory inputs with other participants in a communication session. Through monitoring of historical communication sessions in which the user was a participant, the exemplary embodiments may determine linkages between topics and reactions. In monitoring a current communication session, the exemplary embodiments may predict a predicted sentiment based on the topic being discussed and a predicted expression based on recognition techniques. For intentional reactions, the exemplary embodiments may selectively obfuscate reactions having a negative reward so that a set of other participants are shown the reaction and a remainder of the other participants are shown a mask obfuscating the user. For unintentional reactions, the exemplary embodiments may obfuscate such reactions to the other participants of the communication session. In this manner, the exemplary embodiments may dynamically assign filtering rules to obfuscate the user's reactions as communication sessions progress and various topics are discussed.

Figure 3:
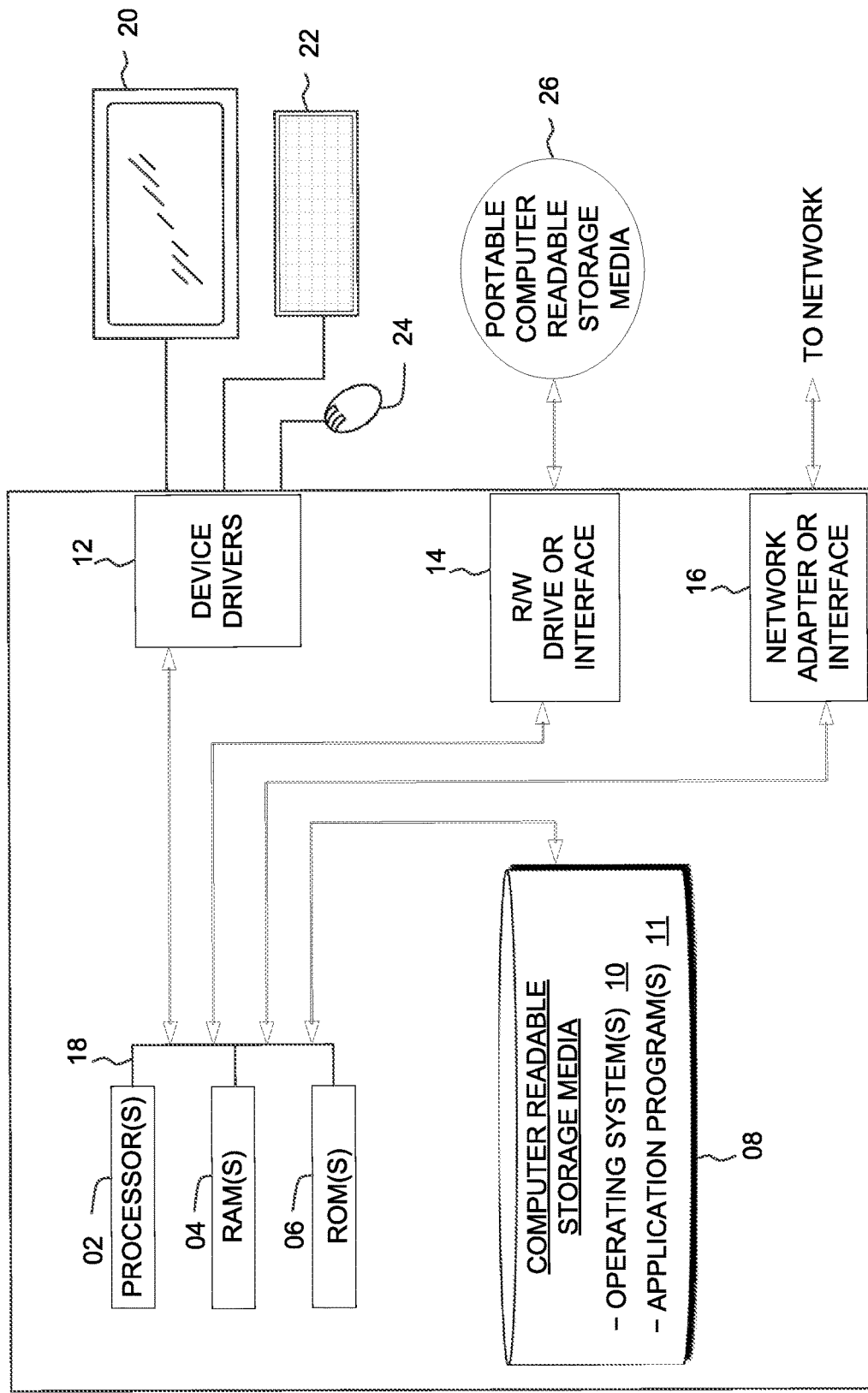
FIG. 3 depicts an exemplary block diagram depicting the hardware components of the emotion obfuscating system 100 of FIG. 1, in accordance with the exemplary embodiments.

FIG. 3 depicts a block diagram of devices within the emotion obfuscating system 100 of FIG. 1, in accordance with the exemplary embodiments. It should be appreciated that FIG. 3 provides only an illustration of one implementation and does not imply any limitations with regard to the environments in which different embodiments may be implemented. Many modifications to the depicted environment may be made.

Devices used herein may include one or more processors 02, one or more computer-readable RAMs 04, one or more computer-readable ROMs 06, one or more computer readable storage media 08, device drivers 12, read/write drive or interface 14, network adapter or interface 16, all interconnected over a communications fabric 18. Communications fabric 18 may be implemented with any architecture designed for passing data and/or control information between processors (such as microprocessors, communications and network processors, etc.), system memory, peripheral devices, and any other hardware components within a system.

One or more operating systems 10, and one or more application programs 11 are stored on one or more of the computer readable storage media 08 for execution by one or more of the processors 02 via one or more of the respective RAMs 04 (which typically include cache memory). In the illustrated embodiment, each of the computer readable storage media 08 may be a magnetic disk storage device of an internal hard drive, CD-ROM, DVD, memory stick, magnetic tape, magnetic disk, optical disk, a semiconductor storage device such as RAM, ROM, EPROM, flash memory or any other computer-readable tangible storage device that can store a computer program and digital information.

Devices used herein may also include a R/W drive or interface 14 to read from and write to one or more portable computer readable storage media 26. Application programs 11 on said devices may be stored on one or more of the portable computer readable storage media 26, read via the respective R/W drive or interface 14 and loaded into the respective computer readable storage media 08.

Devices used herein may also include a network adapter or interface 16, such as a TCP/IP adapter card or wireless communication adapter (such as a 4G wireless communication adapter using OFDMA technology). Application programs 11 on said computing devices may be downloaded to the computing device from an external computer or external storage device via a network (for example, the Internet, a local area network or other wide area network or wireless network) and network adapter or interface 16. From the network adapter or interface 16, the programs may be loaded onto computer readable storage media 08. The network may comprise copper wires, optical fibers, wireless transmission, routers, firewalls, switches, gateway computers and/or edge servers.

Devices used herein may also include a display screen 20, a keyboard or keypad 22, and a computer mouse or touchpad 24. Device drivers 12 interface to display screen 20 for imaging, to keyboard or keypad 22, to computer mouse or touchpad 24, and/or to display screen 20 for pressure sensing of alphanumeric character entry and user selections. The device drivers 12, R/W drive or interface 14 and network adapter or interface 16 may comprise hardware and software (stored on computer readable storage media 08 and/or ROM 06).

The programs described herein are identified based upon the application for which they are implemented in a specific one of the exemplary embodiments. However, it should be appreciated that any particular program nomenclature herein is used merely for convenience, and thus the exemplary embodiments should not be limited to use solely in any specific application identified and/or implied by such nomenclature.

Based on the foregoing, a computer system, method, and computer program product have been disclosed. However, numerous modifications and substitutions can be made without deviating from the scope of the exemplary embodiments. Therefore, the exemplary embodiments have been disclosed by way of example and not limitation.

It is to be understood that although this disclosure includes a detailed description on cloud computing, implementation of the teachings recited herein are not limited to a cloud computing environment. Rather, the exemplary embodiments are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 4:
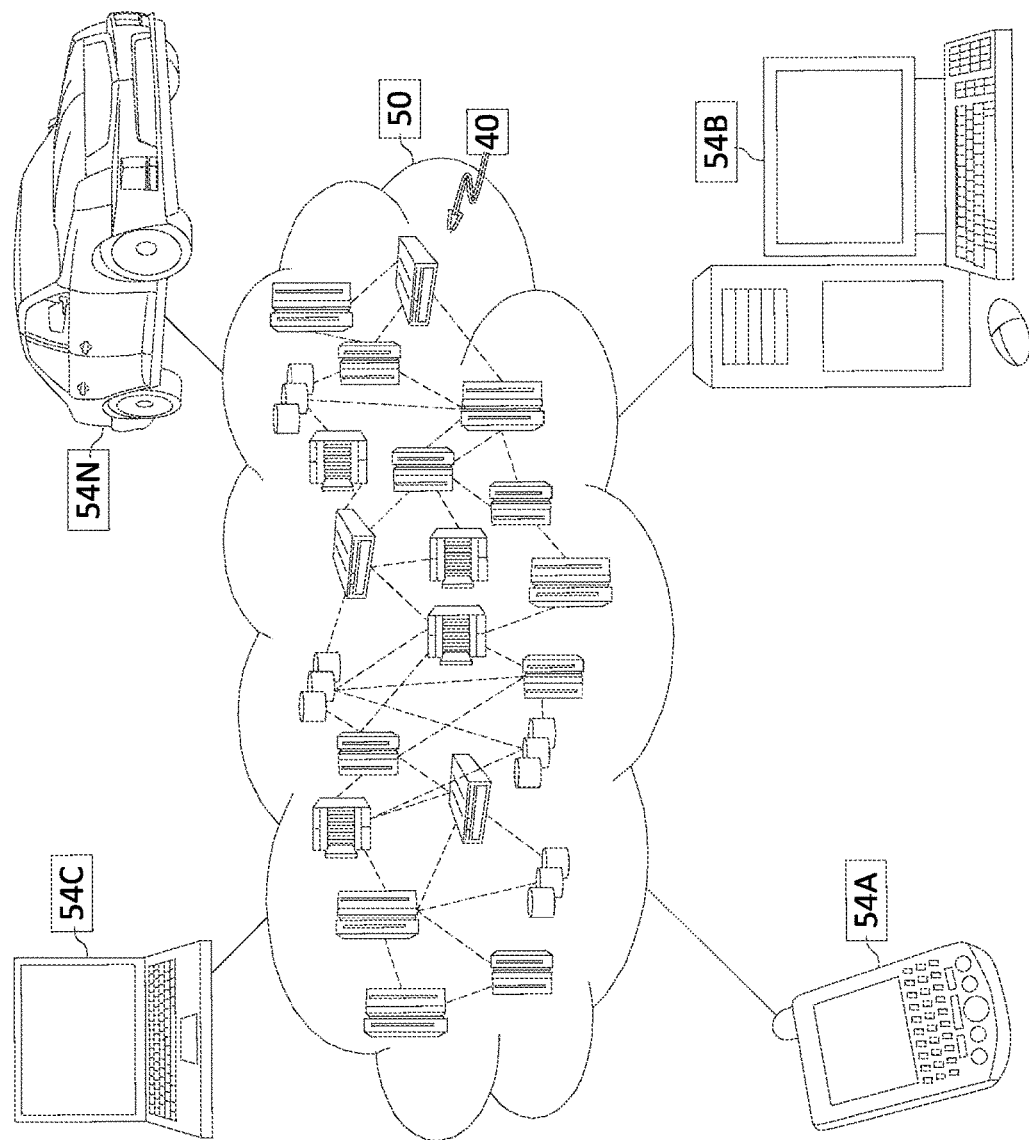
FIG. 4 depicts a cloud computing environment, in accordance with the exemplary embodiments.

Referring now to FIG. 4, illustrative cloud computing environment 50 is depicted. As shown, cloud computing environment 50 includes one or more cloud computing nodes 40 with which local computing devices used by cloud consumers, such as, for example, personal digital assistant (PDA) or cellular telephone 54A, desktop computer 54B, laptop computer 54C, and/or automobile computer system 54N may communicate. Nodes 40 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 4 are intended to be illustrative only and that computing nodes 40 and cloud computing environment 50 can communicate with any type of computerized device over any type of network and/or network addressable connection (e.g., using a web browser).

Figure 5:
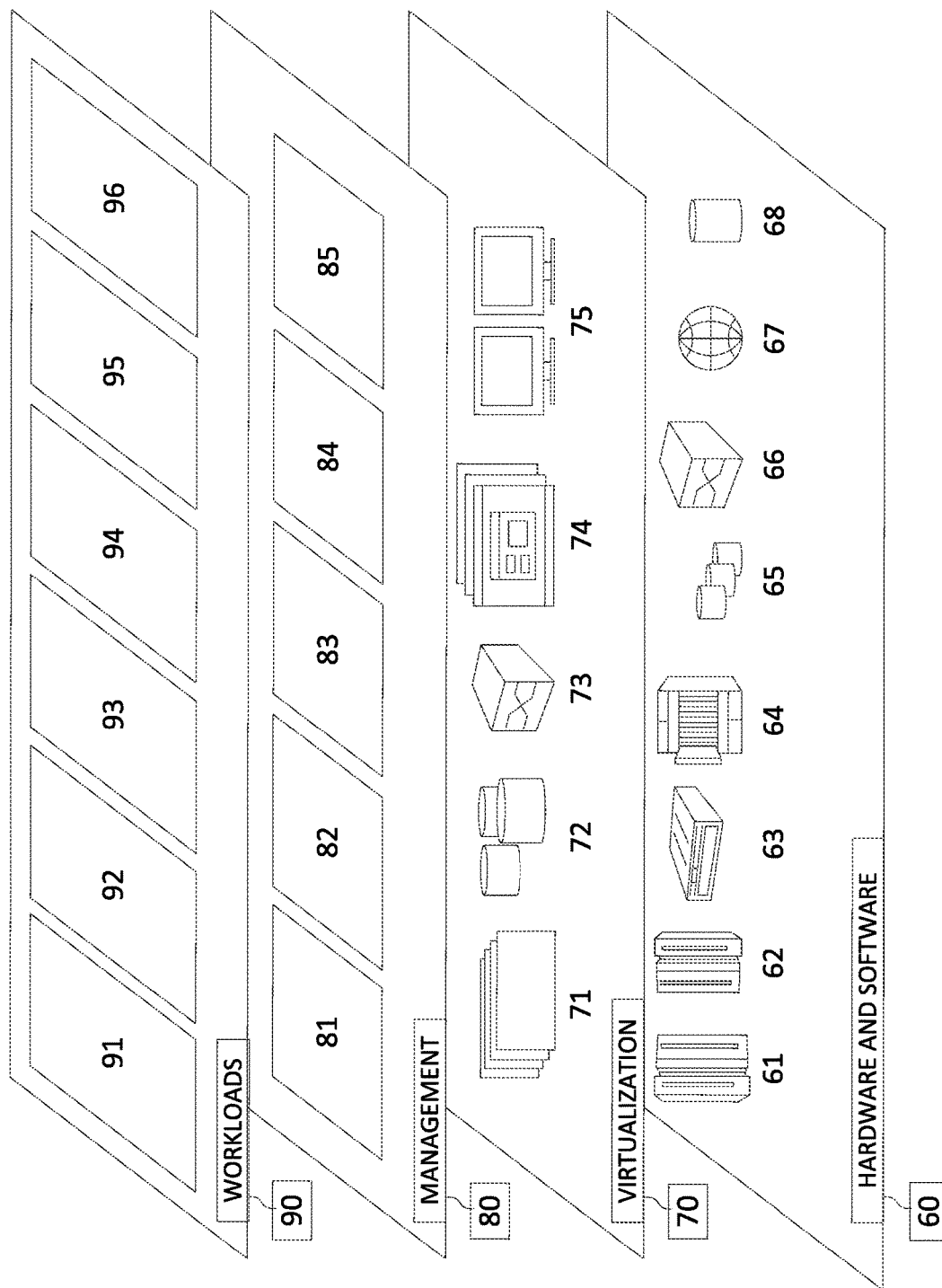
FIG. 5 depicts abstraction model layers, in accordance with the exemplary embodiments.

Referring now to FIG. 5, a set of functional abstraction layers provided by cloud computing environment 50 (FIG. 4) is shown. It should be understood in advance that the components, layers, and functions shown in FIG. 5 are intended to be illustrative only and the exemplary embodiments are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and reaction obfuscation processing 96.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The invention claimed is:

1. A computer-implemented method for selectively obfuscating a reaction during a communication session, the method comprising: determining a predicted sentiment for a user who is one of a plurality of participants in a communication session based on a topic being discussed in the communication session; determining a predicted expression for a reaction to be exhibited by the user based on sensory inputs received from the user while the topic is being discussed; determining an intent of the reaction based on the predicted sentiment and the predicted expression, wherein the intent indicates whether the reaction is intentional or unintentional based on whether the predicted sentiment corresponds to the predicted expression or the predicted sentiment is opposite the predicted expression, respectively; determining a reward score of the reaction based on a type of the reaction and a context of the communication session while the predicted expression is to be exhibited; measuring the reward score against a score threshold, the reward score being under the score threshold indicative of the reaction having a negative reward, the reward score being over the score threshold indicative of the reaction having a positive reward; and rendering a mask over the user based on at least one of the intent and the reward score.

2. The computer-implemented method of claim 1, wherein the predicted sentiment is determined using a sentiment profile of a participant profile of the user generated based on historical communication sessions in which the user participated, the sentiment profile indicating linkages between topics discussed in the historical communication sessions and corresponding reactions exhibited in the historical communication sessions.

3. The computer-implemented method of claim 1, wherein, as a result of the reaction being intentional and having the negative reward, the method further comprises: identifying one or more of the other participants of the communication session who is to be shown the reaction of the user, wherein the mask rendered over the user represents the reaction of the user that is viewed by the identified other participants, wherein the mask rendered over the user obfuscates the user to remaining ones of the other participants of the communication session.

4. The computer-implemented method of claim 1, wherein, as a result of the reaction being unintentional, the mask rendered over the user obfuscates the user to the other participants of the communication session.

5. The computer-implemented method of claim 1, wherein, as a result of the reaction being intentional and having the positive reward, the mask rendered over the user is a blank mask that shows the reaction of the user to the other participants of the communication session.

6. A computer program product for selectively obfuscating a reaction during a communication session, the computer program product comprising: one or more non-transitory computer-readable storage media and program instructions stored on the one or more non-transitory computer-readable storage media capable of performing a method, the method comprising: determining a predicted sentiment for a user who is one of a plurality of participants in a communication session based on a topic being discussed in the communication session; determining a predicted expression for a reaction to be exhibited by the user based on sensory inputs received from the user while the topic is being discussed; determining an intent of the reaction based on the predicted sentiment and the predicted expression, wherein the intent indicates whether the reaction is intentional or unintentional based on whether the predicted sentiment corresponds to the predicted expression or the predicted sentiment is opposite the predicted expression, respectively; determining a reward score of the reaction based on a type of the reaction and a context of the communication session while the predicted expression is to be exhibited; measuring the reward score against a score threshold, the reward score being under the score threshold indicative of the reaction having a negative reward, the reward score being over the score threshold indicative of the reaction having a positive reward; and rendering a mask over the user based on at least one of the intent and the reward score.

7. The computer program product of claim 6, wherein the predicted sentiment is determined using a sentiment profile of a participant profile of the user generated based on historical communication sessions in which the user participated, the sentiment profile indicating linkages between topics discussed in the historical communication sessions and corresponding reactions exhibited in the historical communication sessions.

8. The computer program product of claim 6, wherein, as a result of the reaction being intentional and having the negative reward, the method further comprises: identifying one or more of the other participants of the communication session who is to be shown the reaction of the user, wherein the mask rendered over the user represents the reaction of the user that is viewed by the identified other participants, wherein the mask rendered over the user obfuscates the user to remaining ones of the other participants of the communication session.

9. The computer program product of claim 6, wherein, as a result of the reaction being unintentional, the mask rendered over the user obfuscates the user to the other participants of the communication session.

10. The computer program product of claim 6, wherein, as a result of the reaction being intentional and having the positive reward, the mask rendered over the user is a blank mask that shows the reaction of the user to the other participants of the communication session.

11. A computer system for selectively obfuscating a reaction during a communication session, the computer system comprising: one or more computer processors, one or more computer-readable storage media, and program instructions stored on the one or more of the computer-readable storage media for execution by at least one of the one or more processors capable of performing a method, the method comprising: determining a predicted sentiment for a user who is one of a plurality of participants in a communication session based on a topic being discussed in the communication session; determining a predicted expression for a reaction to be exhibited by the user based on sensory inputs received from the user while the topic is being discussed; determining an intent of the reaction based on the predicted sentiment and the predicted expression, wherein the intent indicates whether the reaction is intentional or unintentional based on whether the predicted sentiment corresponds to the predicted expression or the predicted sentiment is opposite the predicted expression, respectively; determining a reward score of the reaction based on a type of the reaction and a context of the communication session while the predicted expression is to be exhibited; measuring the reward score against a score threshold, the reward score being under the score threshold indicative of the reaction having a negative reward, the reward score being over the score threshold indicative of the reaction having a positive reward; and rendering a mask over the user based on at least one of the intent and the reward score.

12. The computer system of claim 11, wherein the predicted sentiment is determined using a sentiment profile of a participant profile of the user generated based on historical communication sessions in which the user participated, the sentiment profile indicating linkages between topics discussed in the historical communication sessions and corresponding reactions exhibited in the historical communication sessions.

13. The computer system of claim 11, wherein, as a result of the reaction being intentional and having the negative reward, the method further comprises: identifying one or more of the other participants of the communication session who is to be shown the reaction of the user, wherein the mask rendered over the user represents the reaction of the user that is viewed by the identified other participants, wherein the mask rendered over the user obfuscates the user to remaining ones of the other participants of the communication session.

14. The computer system of claim 11, wherein, as a result of the reaction being unintentional, the mask rendered over the user obfuscates the user to the other participants of the communication session.

* * * * *